(12) United States Patent
Gonzalo Vaca et al.

(10) Patent No.: US 10,204,098 B2
(45) Date of Patent: Feb. 12, 2019

(54) METHOD AND SYSTEM TO COMMUNICATE BETWEEN DEVICES THROUGH NATURAL LANGUAGE USING INSTANT MESSAGING APPLICATIONS AND INTEROPERABLE PUBLIC IDENTIFIERS

(71) Applicants: Antonio Gonzalo Vaca, Madrid (ES); Javier Bento Chaves, Madrid (ES)

(72) Inventors: Antonio Gonzalo Vaca, Madrid (ES); Javier Bento Chaves, Madrid (ES)

(*) Notice: Subject to any disclaimer, the term of this patent is extended or adjusted under 35 U.S.C. 154(b) by 23 days.

(21) Appl. No.: 15/430,625

(22) Filed: Feb. 13, 2017

(65) Prior Publication Data
US 2018/0232356 A1 Aug. 16, 2018

(51) Int. Cl.
*G06F 17/27* (2006.01)
*H04L 12/58* (2006.01)
*H04W 8/22* (2009.01)
*H04W 84/04* (2009.01)

(52) U.S. Cl.
CPC .......... *G06F 17/279* (2013.01); *G06F 17/278* (2013.01); *H04L 51/04* (2013.01); *H04L 51/18* (2013.01); *H04L 51/32* (2013.01); *H04W 8/22* (2013.01); *H04W 84/042* (2013.01)

(58) Field of Classification Search
CPC ...... G06F 17/279; G06F 17/278; H04W 8/22; H04W 84/042; H04L 51/18; H04L 51/04; H04L 51/32
USPC .......................................................... 704/9
See application file for complete search history.

(56) References Cited

U.S. PATENT DOCUMENTS

| | | | | |
|---|---|---|---|---|
| 2002/0002899 A1* | 1/2002 | Gjerdingen | ....... | G06F 17/30743 84/667 |
| 2007/0136472 A1* | 6/2007 | Jardin | ................. | H04L 12/2856 709/226 |
| 2009/0234652 A1* | 9/2009 | Kato | ..................... | G10L 13/033 704/260 |
| 2010/0250257 A1* | 9/2010 | Hirose | .................. | G10L 13/033 704/278 |
| 2015/0317977 A1* | 11/2015 | Manjunath | .............. | G10L 17/00 704/270 |
| 2015/0350116 A1* | 12/2015 | Bhagwan | ................ | H04L 51/00 709/206 |
| 2017/0094059 A1* | 3/2017 | Jacobstein | ........ | H04M 3/53391 |

* cited by examiner

Primary Examiner — Bharatkumar S Shah

(57) ABSTRACT

A system and method to communicate between devices through natural language using instant messaging applications and interoperable public identifiers where the method comprises the stages of receiving an instant messaging module from an instant messaging client, an instant message in natural language, with an interoperable public identifier, identifying said message as a message to be processed because said interoperable public identifier corresponds to the public identifier that uniquely identifies said instant messaging module, processing said instant message and resending said message to a natural language processing module, processing the content of said message in said natural language processing module to translate said content into at least one specific command for a target device and launch the execution of the at least said command in said target device.

23 Claims, 3 Drawing Sheets

METHOD AND SYSTEM TO COMMUNICATE BETWEEN DEVICES THROUGH NATURAL LANGUAGE USING INSTANT MESSAGING APPLICATIONS AND INTEROPERABLE PUBLIC IDENTIFIERS

FIELD AND BACKGROUND OF THE INVENTION

The present invention generally relates to a system and method to provide interoperability and control between devices, with or without users being involved, using an interoperable identifier and instant messages expressed in natural language.

Messaging applications are extensively used and very popular in Europe, America and other parts of the world. These applications focus on communication between humans, where the applications do not handle the meaning of the message per se, trusting the users to understand it and the possible action that may be derived from the message.

A user may use a controlling device, such as a mobile telephone, tablet, smart watch, etc., to operate and control other devices and/or communicate with other controlling devices. The Internet of Things (IoT) is a response to this need to remotely control devices. Today, the process is such that the user sends commands or information remotely through a controlling device, these specific messages being for a type of device with respect to another type, therefore adapted to the different protocols that these machines and devices understand, in some cases through different messaging applications, such as applications or mobile APPs for example.

Therefore, the user must use different applications with different interfaces (text or graphic) that send these messages to the target devices. These applications are responsible for translating and adapting the commands and instructions of the user to the specific protocol of each device. Due to this, the number of applications to remotely control and monitor devices is increasing rapidly.

Normally, these applications are not compatible with each other, since both the devices and the applications, both software and hardware, are made and developed by different providers. For example, it is not possible to send the same message to a device from Facebook Messenger, WhatsApp or Telegram, since these applications may use different messaging clients both in the controller device and the target device.

There are solutions such as the one proposed in the document U.S. Pat. No. 6,895,379B2 that proposes an interface that receives requests in natural language from a user and that are transmitted to a natural language server, preferably over the internet. The server processes the request and converts it into commands that may be executed in the devices that the user has.

Document EP2801973A1 proposes a method where a device may recognize the voice that is translated into commands for devices. It is shown that the command may be received in natural language, text, text to voice conversion or vice versa, etc. It is aimed at controlling devices in the home, such as thermostats, lights, etc.

Furthermore, document US20150279366A1 focuses on processing natural language and the interaction with electronic devices; and specifically on that in a user of a voice command or a request is received from a device, for example an IoT device, and such requests are "intelligently" processed by a device, selecting the best possible answer, such that a suitable dialogue or interaction is established between the devices and the users. The recognition process is based in the cloud. The invention mainly focuses on processing requests based on classifying the information received to search for the best response possible.

Document US20150264543A1 shows how to access and control peripheral devices, such as a smart watch for example, by connecting the devices to a social network and using instant messaging, chat. The aim is to reduce the use of different interfaces and therefore learning about the same by the users. In general, the invention focuses more on how to connect the devices to the social network and from there it talks more about translating the information of the devices into a natural language or more understandable for users.

Another document, KR2015069961A relates to a method to control a household device that comprises the steps of receiving in the device a syntax in natural language; determining whether the received syntax in natural language includes information on devices of the homes and, in accordance with the result of this check, selecting the device it is intended for, and generating a control command to control the selected device. In the description translated from Korean, it states that the syntax may be sent through instant messaging or with a dedicated application.

Lastly, document CN104113529A describes a method that, focusing on the use of natural language, aims to connect the IoT world with the social network world. It proposes an IoT Gateway that has a network or social network account as if it were another user, such that the users can interact with the IoT devices or these may report to the networks of the users in a more understandable language for the users. Based on the available translation from Chinese, it follows that everything focuses on the interaction with the Gateway and the configuration thereof.

SUMMARY OF THE INVENTION

An alternative to the state of the art must be offered that covers the shortcomings therein, and therefore, unlike the current solutions, the present invention focuses on resolving the problem of interoperability with devices by using one interoperable identifier as an identifier, instant messages to contain and transport the information and natural language processing as a universal protocol to manage and control devices in all cases, even between devices when there is no human involved.

The embodiments described below therefore present a method and system to provide interoperability and control between devices, with or without users being involved, using an interoperable identifier and instant messages expressed in natural language. It includes a controller device, such as a mobile telephone or a smart lock for example, a target device, such as an electric heater, and several additional modules, such as a natural language processing module, an instant message module and a public network communications module.

An interoperable public identifier is a text string, normally unique and unequivocal numbers, used to establish communications between different elements or devices within a network, such as a single subscriber of a mobile station integrated services digital network (MSISDN) or a SIP (Session Initiation Protocol) address.

An instant message is a text string sent from a monitoring device to inform or carry out an action in several target devices. Instant messages are typically created by humans, and therefore expressed in natural language. These messages, in the present invention, are used between devices to discover the capacities of the devices, request information and carry out actions based on the status of other devices.

The instant message from the controller device is identified with the interoperable public identifier of the controller and is sent to the target device, which is identified by another interoperable public identifier. The public network communications module in the target device authenticates and verifies the message and delivers the message to the communication modules of the device. The instant messaging module delivers the message to the natural language module, which interprets, plans and executes an action if necessary. The natural language module may also provide, if necessary, control instruction from the device, expressed in the protocol of the device.

Once interpreted and executed, the instant message module delivers the output of the natural language module, if there is any, to the appropriate instant messaging client. This output may be another instant message, also formed of natural language.

Specifically, the present invention shows a system and a method to communicate between devices through natural language using instant messaging applications and interoperable public identifiers.

The method comprises the stages of receiving at an instant messaging module (130) from an instant messaging client (111), an instant message in natural language, with an interoperable public identifier, identifying said message as a message to be processed because said interoperable public identifier corresponds to the public identifier that uniquely identifies said instant messaging module (130), processing said instant message and resending said message to a natural language processing module (140), processing the content of said message in said natural language processing module (140) to translate said content into at least one specific command for a target device (120) and launch the execution of the at least said command in said target device (120).

Whilst the system comprises at least one controlling device (110) comprising: a) a public network communications module (112) arranged to communicate with a public land mobile network, being identified in the network with a unique public identifier, b) an instant messaging client (111) that receives and sends message in natural language and at least one target device (120) comprising: a) a public network communications module (121) arranged to communicate with a public land mobile network, being identified in the network with a unique public identifier, b) an instant messaging module (130) that receives, identifies, routes and sends messages in natural language, c) a natural language processing module (140) arranged to interpret the information in natural language of an instant message and translate it into at least one specific command of the target device, launch the execution of the at least one command in the device and optionally generate a response in natural language based on the result of the execution of the at least one command, d) a device control unit (150) arranged to control the operation of the actions linked to at least one command, and e) a device state unit (151) arranged to monitor, store and provide the status of the target device (120).

BRIEF DESCRIPTION OF THE SEVERAL VIEWS OF THE DRAWINGS

The foregoing and other advantages and characteristics will be more fully understood based on the following detailed description of embodiments, with reference to the following figures, which must be considered as illustrative and non-limiting.

DESCRIPTION OF SPECIFIC EMBODIMENTS OF THE INVENTION

Figure 1:
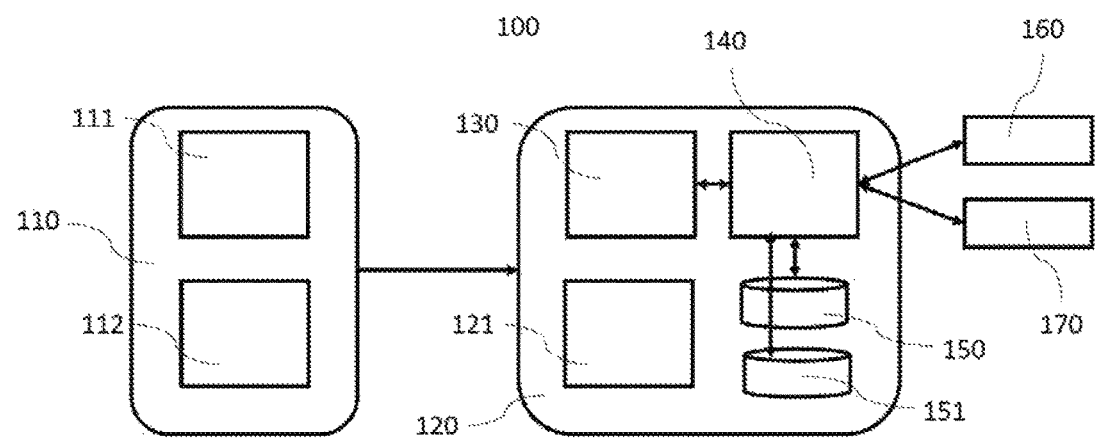
FIG. 1. Shows a general diagram of the system object of this invention, the elements and modules thereof and the communication links between them.
Figure 2:
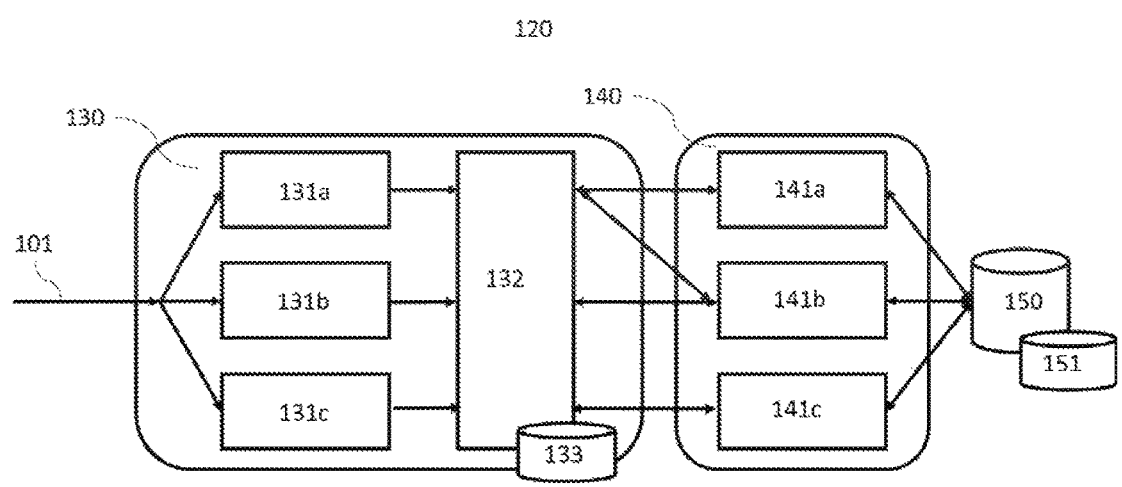
FIG. 2. Shows a detailed diagram of the modules that form part of the instant messaging (IM) modules and natural language (NL) processing and the links between them.
Figure 3:
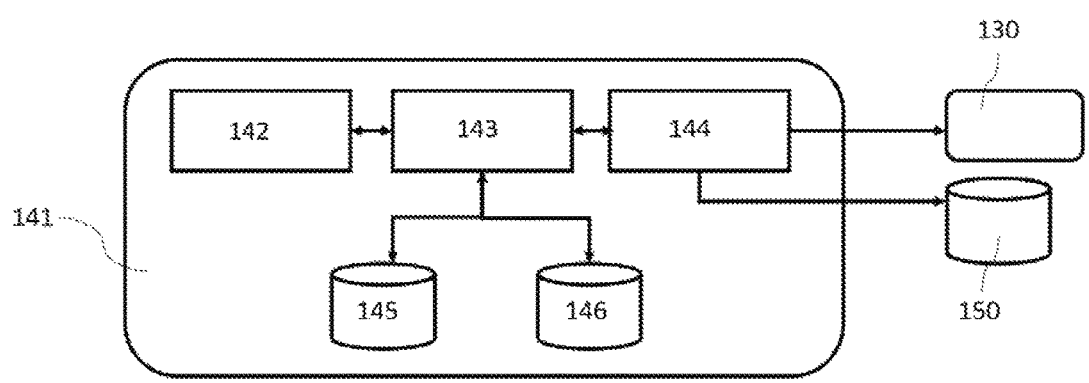
FIG. 3. Shows a detailed diagram of an embodiment of a natural language (NL) processing module implemented in a local server.

The system (100) object of the present invention shows a controlling device (110) and at least one target device (120), each one with its respective public network communications modules (112 and 121).

The controlling device (110) (CD) represents any device capable of remotely controlling devices using natural language as an input, such as, for example, a mobile telephone, tablet or laptop. The input of said natural language is through a messaging client (111), developed and maintained by third parties independent from the present invention. Such as, for example, in a non-limiting manner, messaging applications by WhatsApp, Facebook, Google, etc. It may also be a program, capable of controlling devices. The implementation of this controlling device (110) may include hardware, software, firmware and/or a combination thereof.

The target device (120) (TD) represents any device capable of executing instant messaging clients and, therefore, capable of receiving instant messages expressed in natural language and carry out any action or instruction linked to the interpretation of said natural language. This device (120) may be implemented by hardware, software, firmware and/or a combination thereof.

An instant message is one or several sentences, expressed in natural language, which may or may not include an order or request, question or information in the form of parameters and/or context. It is created and introduced by a human or machine that uses natural language in the controlling device, or transcribed from a voice conversation application to text. The order or request, question or information may not be explicit, the interpretation being open depending on the accuracy of the natural language module.

The public network communications module (112 and 121) (PNC) is a module responsible for establishing, modifying and ending communication sessions using any public land mobile network. To use these public networks, the devices, both the controlling device and target device, must have a valid pubic identifier number (PIN), such as a mobile station integrated services digital network (MSISDN) or a SIP address to route messages between them. This number is provided by the network operator and is used as a global identifier of the entire system for each of these devices. That is to say, both the controlling device (110) (CD) and the target device (120) (TD) have a communications module of this type (112 and 121) (PNC), which enables communications to be established between them through a public mobile network. In general, this type of communications module is already incorporated in devices such as smart phone, tablets, etc. Said public communications network may be, and by no means limited to a mobile 2G, 3G or 4G network, an LW PA network, etc.

The instant messaging (IM) module (130) located in the target device, is a module responsible for receiving, validating or identifying and routing the instant messages and as a bridge for managing conferences between multiple participants in the same communication session and, therefore, receive instant messages from various devices. This module (130) has a unique, interoperable identifier inside the network in which the target device (120) is found and when it receives an instant message, it identifies said message in natural language as its own, checking the public identifier that is linked to said message.

This module authenticates the instant message received by identifying the source of the message, i.e., that it comes from a valid PIN and verifies the security and integrity of the transmission, which may include encryption and/or digital signatures. This module is also responsible for identifying the target application of the instant message (SMS, Facebook Messenger, WhatsApp, etc.) that the target device may have available, selecting or prioritising if applicable, to then transmit the message. This routing does not analyse the text, only the signalling parameters that the message includes to, for example, distinguish between a SMS or WhatsApp message.

In order to identify different instant messaging applications and protocols, inside the instant messaging module (130) is referred to as instant messaging OTT module (132) (IM OTT—instant messaging over-the-top module). The interoperable public identifier is used by this module to link the data of the message from the user of the instant message with the target device, extract the text string from the specific instant message and create a unique conversation master record which is carried out independently from the instant messaging application used (SMS, WhatsApp, etc.). That is to say, the instant messaging module (130) may have one or several local instant messaging servers (131a, 131b, 131c) that process messages of a specific type and where said processing of said message includes, depending on the type of local server (131a, 131b, 131c) (SMS, WhatsApp, Facebook, Telegram, etc.), sending said message by the OTT module (132) to a local server (141a, 141b, 141c) of the natural language processing module (140) that processes specifically these types of messages.

There are several methods for carrying out said extraction of the instant messages and they depend on the instant messaging application. These methods go from the analysis of the text string of the body of the message to the optical or visual recognition of characters of a video output signal that is activated by the instant message in the target device. The extracted conversions are added and stored in the session manager database (133) (SMD), including all the messages of all the parties involved in a conference session, each one of them identified by the PIN. This database (133) may be remote or local to the instant message module (130) (IM module).

The natural language processing module (140) (NL) is a module belonging to the target device (120), which is responsible for interpreting the text string included in the instant message, translating into the communication protocol of the target device that it may interpret, and compose and resend the correct response to the instant message module (130) (IM Module). The target devices (120) have their own communication protocol, which is not expressed in natural language, defined and maintained by different suppliers or providers, and therefore, not interoperable without translation.

This natural language processing module (140) may be implemented directly in said device (120) or have an access, inside said target device (120) to a third party web service (for example, wit.ai, api.ai, or any other type), to which it must be connected. This option of being a module with complete functionality in said device (120) or with remote access may depend on the complexity of the implementation and on the case of specific use.

The natural language processing module (140) (NL) also includes an action planner (143), a command library (145), a device status library (146), a device command interpreter (142) and a response unit (144). It is capable of carrying out an action in the target device, translating the command interpreted into the device protocol and then interacting with the controlling unit (150) of the device.

When the natural language module (140) requires more information to carry out the tasks, it can communicate remotely with different natural language processing servers or protocol interpretation servers of the device controllers.

The translation of the text string of instant messaging expressed in natural language into the communication protocol of the specific target device (120) is carried out in this module (140). Initially, the text string of the instant message is translated into targets, parameters and context in the command interpreter (143). With this information, the action planner (143) is responsible for making decisions to suitably respond to the command, request for information that the user made. The action planner (143) is supported by the command library (145) and device status (146) available to carry out the operation.

The response unit (144) is responsible for composing the appropriate response through another instant message in natural language or an instruction for the device control unit (150), or for both. This controlling unit (150) is responsible for translating the instruction (target, parameters, context) into the specific communication protocol of the device, normally developed or installed by the provider for each device. The specific details and instructions of the communication protocol of the target device may be stored locally or remotely from the server of a third party, in which it is known as a specific "connector" of the device. Once the device carries out the action, another response, if there is one, may be generated and resent to the instant message module (130).

The device controlling unit (150) is a module responsible for intervening, storing and subscribing to all the messages of the device, expressed in the specific communication protocol of said device. The device status unit (151) is a unit responsible for storing and providing the status of the device. These modules may be located in the target device or be remote, and may be maintained by third parties.

In the case that an exceptional event takes place proactively in the target device (120) which requires user information or interaction on its behalf, the device sends the event to the response unit (144) and then to the action planner (143), which decides which response and how, which may also develop into a consultation with the controlling device (110), expressed in natural language.

As has already been mentioned, the main technical problem that the present invention resolves is the interoperability of the device, which is obtained due to all the protocols and parameter of the device that translate into a natural language and later they are sent through an instant message to the devices included in the same conference session, that are translated from the text of the instant message to the protocol of the target device. The natural language is, therefore, the de facto standard for communication between devices and humans.

The nature of the service that may be provided with this invention is to use a conference session with various users or controlling devices (120), each one with the valid PINs thereof, as if they were messaging groups. To handle these sessions, the instant messaging OTT module (132) (IM OTT) is connected to one or several instant messaging servers (131*a*, 131*b*, 131*c*) available in the target device (120). Each instant messaging module (130) stores, for each messaging group, a master group identifier (ID) and a list with all the members of the group, the interoperable public IDs, and the preferred instant messaging client for the communication. It is stored in the session manager database (133). For each instant message received by any instant messaging client, it also stores the time stamp and message content, creating a record for this master group.

If necessary, the instant messaging module (130) may send an extract of the messaging master record to each participant for the given time stamp. It may also extract information from preferred instant messaging clients from third parties or add third parties to the communication session.

When the target device (120) needs to send an instant message as a response to all the participants in the communication session, it generates an individual message with the same content for each participant of the group. For each participant, the instant messaging module uses the preferred instant messaging client for each target device, unless there is no previous record, in which case the default instant messaging client of the controller (110) is used.

What is claimed is:

1. A method to communicate between devices through natural language using instant messaging applications and interoperable public identifiers comprising:

receiving at an instant messaging module (130) of a target device, from an instant messaging client (111) of a controlling device, an instant message in natural language, the said instant message including an interoperable public identifier, wherein a content of the said instant message includes text strings representing at least one specific command to be carried out and control an operation of the said target device;

identifying the said instant message as a message to be processed when the said interoperable public identifier corresponds to the public identifier that uniquely identifies the said instant messaging module (130);

processing the said instant message and forwarding the said instant message to a natural language processing module (140);

processing the content of the said instant message in the said natural language processing module (140) and translating the said text strings into the said at least one specific command in a communication protocol of the said target device (120); and automatically launching an execution of the said at least one specific command in the said target device (120) to control the operation of the said target device.

2. The method of claim 1, further comprising, following the launching of the execution of the at least the said command, generating a response in natural language from the result of the said execution and the said response is communicated to the said instant messaging client (111).

3. The method of claim 1, wherein a response in natural language is generated from the status monitoring information of the said target device (120).

4. The method of claim 1, wherein the receipt of the said instant message from the said instant messaging client (111) is carried out in at least one local instant messaging server (131*a*, 131*b*, 131*c*), which processes messages of a certain type and wherein the said processing of the said message includes, depending on the type of local server (131*a*, 131*b*, 131*c*), resending the said message to a local server (141*a*, 141*b*, 141*c*) of the natural language processing module (140) which processes this type of messages.

5. The method of claim 4, wherein the said local instant messaging server modules (131*a*, 131*b*, 131*c*) handle instant messages from Facebook, Telegram, WhatsApp or SMS.

6. The method of claim 1, wherein the said processing the content of the said message in the said natural language processing module (140) includes interpreting the information in natural language of the said instant message in order to translate it into the said at least one specific command and where the stage of launching the execution of the at least one command in the said target device includes planning the execution of the said at least one command by an action planner (143).

7. The method of claim 1, wherein the processing the content of the said message by the said natural language processing module (140) includes remotely communicating with external servers to request all or part of the interpretation of the information in natural language of the said instant message and translate it into at least one specific command of the said target device.

8. The method of claim 1, wherein the said instant messaging module manages the sessions linked to the same instant messaging conversation of several messaging clients (111).

9. The method of claim 1, wherein the management of the said sessions linked to the same instant messaging conversation includes storing, for each conversation group, a unique identifier, the list of the interoperable public identifiers of the devices of the group and the type of preferred instant messaging for the communication, and for each instant message received or sent, the said message and the time stamp thereof is stored.

10. The method of claim 1, wherein the said unique public identifier is a mobile station integrated services digital network (or MSISDN) or SIP address.

11. A system to communicate between devices through natural language using instant messaging applications and interoperable public identifiers (100) comprising:

at least one controlling device (110) comprising at least a first software, the said first software including code comprising:
   a. code to communicate with a public land mobile network, the said at least one controlling device being identified in the said network with a first unique public identifier,
   b. code to receive and send messages in natural language; and at least one target device (120) comprising at least a second software, the said second software including code comprising:
   a. code to communicate with the said public land mobile network, the said at least one target device being identified in the said network with a second unique public identifier,
   b. code to receive, identify, route and send messages in natural language,
   c. code to interpret information in natural language of a received instant message which includes text strings representing at least one command to be carried out and control an operation of the said target device and translate the said text strings into the said at least one command of the said target device in a communication protocol of the said target device, launch an execution of the said at least one command in the said target device to control the operation of the said target device and optionally generate a response in natural language based on results of the execution of the said at least one command,
d. code to control an operation of actions linked to the said at least one command, and
e. code to monitor, store and provide a status of the said target device (120).

12. The system of claim 11, wherein all exchange of information between the said at least one controlling device and the said at least one target device is conducted in natural language.

13. The system of claim 11, wherein the said at least second software includes code to:
 i. receive the instant messages in natural language by a selected one of plurality of local instant messaging servers of the said at least one target device,
 ii. manage a plurality of sessions each linked to the same instant messaging conversation of a plurality of instant messaging conversations, and
 iii. store information of the said instant messaging conversations.

14. The system of claim 13, wherein each of the said plurality of local instant messaging servers handles instant messages from a different one of a plurality of messages types, the said plurality of messages types includes Facebook, Telegram, WhatsApp and SMS.

15. The system of claim 13, wherein the said at least second software further includes code to route the said instant message from a respective one of the said plurality of local instant messaging servers to a corresponding one of a plurality of local processing servers according to a respective message type handled by the said respective one of the said plurality of local instant messaging servers.

16. The system of claim 13, wherein the said code to store the said information of the said instant messaging conversations is to store for each conversation group, a unique identifier, a list of interoperable public identifiers of each of a plurality of devices of the conversation group and a type of preferred instant messaging for the communication, and for each instant message received or sent, the said message and a time stamp thereof.

17. The system of claim 11, wherein the said at least second software includes code to:
 i. interpret the information in natural language of the said instant message to translate it into the said at least one command,
 ii. plan the execution of the said at least one command based on a command interpretation library,
 iii. carry out at least one action derived from interpreting the command according to a device status of the said at least one target device, and
 iv. execute the at least one action derived from the interpretation of the command and optionally generate a response in natural language based on the result of the execution of the said at least one action of the said at least one command or of a monitored status of the said at least one target device.

18. The system of claim 11, wherein the said at least second software includes code to remotely communicate with external servers to request all or part of the interpretation of the information in natural language of the said instant message and translate it into the said at least one command.

19. The system of claim 11, wherein the said public land mobile network is a mobile 2G, 3G or 4G network or an LWPA network.

20. The system of claim 11, wherein the said first and second unique public identifiers are mobile station integrated services digital network (MSISDN) or a SIP addresses.

21. The method of claim 1, wherein the said target device is a household device.

22. The method of claim 21 wherein the said household device is a member of a group consisting of an electric heater a thermostat and lights.

23. The method of claim 1, wherein the said controlling device is a member of a group consisting of a mobile telephone, a tablet, a laptop and a smart watch.

* * * * *